United States Patent
Emens et al.

(10) Patent No.: US 6,606,643 B1
(45) Date of Patent: Aug. 12, 2003

(54) METHOD OF AUTOMATICALLY SELECTING A MIRROR SERVER FOR WEB-BASED CLIENT-HOST INTERACTION

(75) Inventors: Michael L. Emens, San Jose, CA (US); Daniel A. Ford, Los Gatos, CA (US); Reiner Kraft, Gilroy, CA (US); Gaurav Tewari, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,176

(22) Filed: Jan. 4, 2000

(51) Int. Cl.$^7$ .............................................. G06F 15/16

(52) U.S. Cl. ........................ 709/203; 709/200; 709/224; 709/241; 709/242; 709/245; 709/105

(58) Field of Search ................................ 709/200–203, 709/217–219, 232–237, 238–246, 105, 223–224; 707/10, 204

(56) References Cited

U.S. PATENT DOCUMENTS

| | | | | |
|---|---|---|---|---|
| 5,548,724 A | * | 8/1996 | Akizawa et al. ............ | 709/203 |
| 5,774,660 A | * | 6/1998 | Brendel et al. ............. | 709/203 |
| 5,948,054 A | * | 9/1999 | Nielsen ....................... | 709/200 |
| 6,112,239 A | * | 8/2000 | Kenner et al. .............. | 709/224 |
| 6,154,744 A | * | 11/2000 | Kenner et al. .............. | 709/203 |
| 6,173,312 B1 | * | 1/2001 | Atarashi et al. ............ | 709/203 |
| 6,185,598 B1 | * | 2/2001 | Farber et al. ................ | 709/200 |
| 6,304,913 B1 | * | 10/2001 | Rune ........................... | 709/241 |

OTHER PUBLICATIONS

T. Brisco. *DNS Support for Load Balancing*. Network Working Group RFC 1974, Apr. 1995.

O. Damani, P. Chung, Y. Huang, and C. Kintala. *One—IP: Techniques for Hosting a Service on a Cluster of Machines.* Proceedings of the Sixth International World Wide Web Conference, 1997.

* cited by examiner

*Primary Examiner*—Bharat Barot
(74) *Attorney, Agent, or Firm*—DeLio & Peterson, LLC; Kelly M. Reynolds

(57) ABSTRACT

A method of selecting a mirror server for client-host interaction over a network provides automatic, user-transparent, selection of a particular mirror server from among multiple mirror servers that replicate a host server providing web content over the Internet. The method selects the mirror server that has the best response time for a given client computer requesting web content under changing web traffic and mirror server load conditions. The host server creates and maintains a list of addresses of available mirror servers, preferably ranked according to the load on the mirror servers. In response to an initial information request from the client computer, the host server sends the mirror server list to the client computer along with the requested web content. The client computer creates multiple mirror server requests, corresponding to the mirror servers on the address list, sends the requests to the mirror servers, then compares the round trip response times to determine the optimum mirror server site from which to continue subsequent client-host interaction. The invention also includes methods and apparatus, preferably in the form of computer program products, which are operable at the host server, to create, maintain and send the address list, and other methods and apparatus operable at the client computer, to receive the list, query the mirror servers and select the optimum mirror server for further interaction.

20 Claims, 4 Drawing Sheets

METHOD OF AUTOMATICALLY SELECTING A MIRROR SERVER FOR WEB-BASED CLIENT-HOST INTERACTION

BACKGROUND OF THE INVENTION

1. Field of the Invention

This invention relates to methods of supplying information through a network from a host computer to a client program, such as a web browser. More specifically, this invention relates to methods of automatically selecting an appropriate web server computer from among multiple mirrored servers distributed on the Internet to supply web content to a requesting client.

2. Description of Related Art

As the Internet grows in popularity, and as web sites increase in complexity of content and sophistication of presentation, many web based enterprises have begun to encounter significant problems relating to the speed of their web service. Currently, most host servers consist of a single machine, which may serve up to several million document requests, received from all over the world, each day. In the vast majority of cases, these enterprises have been observing a steady upward trend in the number of requests received, and a corresponding steady increase in the load upon the web server.

Further, most web enterprises plan to add dynamic content to their site in the near future, or are in the process of doing so already. Such dynamic content might include presenting users with graphical user interface forms containing enter-text-here fields, buttons, check-boxes, pull-down menus, and scrolling lists. The growth of content and improved functionality all lead to increased loads on the host server. For many web sites the load is becoming too great for a single server to carry with acceptable response time.

In addition to overloaded servers, network congestion contributes to the slow response time of popular web sites. When a single host server is used, the network connections leading to that server can become a bottleneck, leading to slow response times, even where the server would otherwise be capable of servicing the entire load.

Upgrading the server machine to a more powerful one, or increasing the network capacity are not long term solutions to these twin problems of slow speed, especially when incremental scalability is desirable. Traditionally, most sites have dealt with the speed problem by replacing the single web server with a cluster of co-located replicated servers. Although this may solve the problem of overloaded servers, it does not help alleviate latency arising as a result of network congestion. Instead, a concept that is becoming increasingly popular, especially with respect to software archives, is to geographically distribute the servers, and create "mirror" sites. Such a distributed architecture results in increased availability of the service in times of network congestion and partial unavailability, and has the potential for increased performance by taking into account topological proximity of clients and servers.

A current difficulty with distributed mirror server designs is that the user must manually select a server from a list of mirror servers. One popular web site offering downloadable web browser software currently offers visitors a choice of over 70 mirror sites, distributed all over the world. However, requiring actual human-user mediation to select a particular mirror server is a relatively crude and invasive technique. Moreover, there is no guarantee that the server chosen by the user will, in fact, be an optimal choice. A choice made on the basis of geographical proximity does not guarantee optimality since, in the context of the Internet, factors such as network traffic and server load can be critical in identifying an "optimum" mirror server.

One approach to automating mirror server selection has been based on the Domain Name Server (DNS) system. A DNS approach typically requires that the name server at the server side be modified to respond to translation requests with the IP (Internet Protocol) numbers of different hosts, perhaps in a Round-Robin fashion. As such, client requests are partitioned amongst the various replicated hosts and load is balanced amongst the servers.

There are several problems with this method, however. First, there are usually several intermediate name servers between the client and the Round-Robin DNS, which may cache name-to-IP mapping. The use of such cached results can later create serious load imbalances between the replicated servers. One immediate solution to this problem is to have the Round-Robin DNS specify a time-to-live (TTL) for each resolved name, such that requests made after the specified TTL has expired are not resolved in the local name server, but are instead forwarded to the authoritative DNS which can now return the IP address of the "optimal" web server. Nevertheless, multiple HTTP (hypertext transfer protocol) requests made during a given TTL period will continue to be directed to the same web server, causing the problem to resurface.

Making the TTL very small can help mitigate this effect, but comes at the added cost of significantly increased network traffic for name resolution. Furthermore, many name servers may just ignore a TTL which is smaller than some minimum threshold, choosing to default to some value.

Another potential solution to the problem of automated mirror server selection is to use a HTTP redirect approach. In this method HTTP return code URL redirection is used to perform the load balancing. This approach requires a busy server to return the address of another server, instead of the actual response, and then the client is asked to resubmit its request to the new server. However, the redirecting server knows nothing about the current workload of the new server, which is the target of the redirection.

Typically, HTTP redirection is done for moved web pages or a moved web site and is only used for a limited time frame, to allow people who have bookmarked the old location to continue to access the resource. It is not really useful for load balancing purposes because of the lack of knowledge about the workload of the new server, which is the target of the redirection.

Yet another class of solution uses a server side approach in which a server-side routing module redirects all incoming requests to a set of hosts based upon load characteristics. The routing module becomes a centralized authority responsible for selecting one of many clustered servers to service a request. The major drawback with this approach is that the centralized routing module often exhibits itself as a single point of failure, and as a severe performance bottleneck, thus defying the entire purpose of redirection for enhanced availability and rapid response time.

Bearing in mind the problems and deficiencies of the prior art, it is therefore an object of the present invention to provide a method of automatically selecting a mirror server in which small amounts of data transfer and computation are required, as compared to alternative solutions so that a minimum overhead is imposed upon the system.

It is another object of the present invention to provide a method of automatically selecting a mirror server which eliminates the need for a centralized intermediate agent that tracks individual packets passing between clients and servers.

It is a further object of the present invention to provide a method of automatically selecting a mirror server in which a direct connection is established between the client and the server after a close proximity server has been located by the system.

Yet another object of the present invention to provide a method of automatically selecting a mirror server in which a new web server can be easily added to the existing host replica network without having to modify the existing infrastructure in any significant way.

Still another object of the present invention to provide a method of automatically selecting a mirror server in which load balancing is accomplished without problems arise from client or name-server caching.

It is a further object of the invention to provide a method of automatically selecting a mirror server in which the entire replica-selection process is completely transparent to the human-user who is attempting to access- the web site.

Still other objects and advantages of the invention will in part be obvious and will in part be apparent from the specification.

SUMMARY OF THE INVENTION

The present invention includes software technology intended to be embedded within the client computer web-browser program and a host server program that responds to initial client computer requests. When a client computer tries to access a uniform resource locator (URL) address, (e.g. http://www.hostserver.com) using a web browser program, the information request is sent to a central host server computer to which the internet protocol (IP) address corresponding to the URL www.hostserver.com resolves.

The central host server responds to the client's information request by sending a list of IP addresses in addition to the relevant web content, with each IP address corresponding to an available mirror server. Upon receiving this set of IP addresses, the client computer web browser application initiates multiple, concurrently executing threads ("calibration applets"), each of which corresponds to a (unique) IP address from the received set of mirror server IP addresses.

Subsequently, while the human user is viewing the web content returned by the central host server, each of these applets will, in the background, transparently send identical hypertext transfer protocol (HTTP) mirror server requests to the designated IP addresses of the mirror servers. In turn; the mirror servers will each send a response back to the client computer. The response time will be a function of both the round trip propagation delay through the network and the load on the mirror server. Each calibration applet will measure the round trip latency, i.e., the time elapsed from the sending of the initial mirror server request until a mirror server response is received from the server.

To account for variable delay and sporadic congestion arising from bursty traffic on the Internet, this process is preferably repeated for a specified number of times, and a running average of round trip latency is maintained. The applet program may be configured to discard trial results that appear to be clearly atypical, as inferred from a comparison with other trial results.

Ultimately, the applet with the lowest registered round-trip latency will be identified as the "winner", and the browser connects with the replica mirror server site corresponding to the winner applet's associated IP address for the remainder of its client-host interaction. All further client-host interaction will be optimized and will occur with the particular mirror server selected as the "winner" applet in the context of the client's current Internet session.

The entire calibration process is transparent from the client computer user's point of view. When the client initially attempts to contact a given Internet host, he or she receives the requested web content from the host server program, just as in the conventional model of client-server interaction. However, at the same time, calibration applets will be spawned in the background, invisible to the human user, and these will determine the optimal mirror server (which replicates the initial host server). The human user will be oblivious to the presence of the calibration applets, since he/she will have already received the web content initially requested from the Internet host server specified in the initial information request. Once the optimal mirror server has been identified, all further web content requests made by the client will be sent directly to this mirror server rather than to the central host server. This design allows the present invention to extend the conventional model of client-server interaction, without compromising any of its benefits.

More specifically, the above and other objects and advantages, which will be apparent to one of skill in the art, are achieved in the present invention which is directed to, in a first aspect, a method of selecting a mirror server for client-host interaction over a network comprising the steps of:

a) creating an information request at a client computer, b) sending the information request over the network from the client computer to a host server, c) creating a list of mirror servers at the host server, d) sending a response to the information request, said response being sent from the host server to the client computer over, the network and said response including the list of mirror servers, e) creating a plurality of mirror server requests at the client computer, each mirror server request corresponding to a mirror server on the list of mirror servers, f) sending the plurality of mirror server requests over the network from the client computer to the corresponding mirror servers, g) creating a plurality of mirror server responses to the mirror server requests, each mirror server response being created at one of the corresponding mirror servers responsive to the receipt of one of the mirror server requests, h) sending the mirror server responses over the network from the corresponding mirror server to the client computer, i) receiving a plurality of mirror server responses to the mirror server requests from the corresponding mirror servers, and j) selecting a particular mirror server at the client computer from among the mirror servers responding to the plurality of mirror server requests.

In a preferred embodiment of the invention, the method of selecting a mirror server for client-host interaction over a network includes determining the response time of the mirror servers to the plurality of mirror server requests, ranking the mirror servers according to the response times of the mirror servers, and selecting the particular mirror server at the client computer having the fastest response time.

In another aspect of the invention, the step of creating a list of mirror servers at the host server includes the steps of.
  a) creating load status messages at the mirror servers, each load status message containing load information corresponding to the load on the mirror server,
  b) sending the load status messages over the network from the mirror servers to the host server, and
  c) creating the list of mirror servers at the host server by ranking the mirror servers according to the load information.

In still another aspect of the invention, the step of creating a list of mirror servers at the host server further includes the step of sending load inquiry requests over the network from the host server to the mirror servers, and the step of creating load status messages at the mirror servers comprises creating the load status messages at the mirror servers responsive to the load inquiry requests.

At the host server, it is preferred that the step of creating a list of mirror servers at the host server include continuously maintaining an updated list of load-ranked mirror servers by periodically sending the load status messages from the mirror servers to the host server. The load status messages from the mirror servers to the host server are sent responsive to periodic load inquiry requests from the host server.

At the client computer, it is preferred that the step of creating a plurality of mirror server requests at the client computer includes the steps of:
  a) initiating a plurality of calibration applets, each calibration applet corresponding to a mirror server on the list of mirror servers, and
  b) creating the mirror server request for each mirror server in the calibration applet corresponding to said mirror server, and the step of sending the plurality of mirror server requests over the network includes sending the mirror server request for each mirror server from the calibration applet corresponding to said mirror server to said mirror server.

The step of sending the plurality of mirror server requests over the network from each calibration applet further includes the step of starting a timer in each applet when the corresponding mirror server request is sent and stopping the timer upon receipt of a response to determine the round trip time.

The step of selecting a particular mirror server at the client computer includes the steps of:
  a) reporting the elapsed round trip time from the timers in each calibration applet,
  b) ranking the mirror servers corresponding to the calibration applets reporting a round trip time, and
  c) selecting the particular mirror server having the lowest reported round trip elapsed time.

In the most highly preferred embodiment, the step of selecting a particular mirror server at the client computer includes the steps of:
  a) creating additional mirror server requests in each calibration applet,
  b) sending the additional mirror server requests to the mirror server corresponding to the calibration applet creating the additional mirror server requests,
  c) timing the round trip time with the timer in each calibration applet for the corresponding mirror server from the sending of each mirror server request to the receipt of each mirror server response,
  d) averaging the round trip times in each calibration applet,
  e) reporting averaged round trip times from each calibration applet, and
  f) ranking the mirror servers corresponding to the calibration applets reporting the averaged round trip times.

The invention also includes a program storage device readable by a machine, tangibly embodying a program of instructions executable by the machine to perform method steps for selecting a mirror server for client-host interaction over a network. The method steps in such instructions include:
  a) creating an information request at a client computer
  b) sending the information request over the network from the client computer to a host server,
  c) creating a list of mirror servers at the host server,
  d) sending a response to the information request, said response being sent from the host server to the client computer over the network and said response including the list of mirror servers,
  e) creating a plurality of mirror server requests at the client computer, each mirror server request corresponding to a mirror server on the list of mirror servers,
  f) sending the plurality of mirror server requests over the network from the client computer to the corresponding mirror servers,
  g) creating a plurality of mirror server responses to the mirror server requests, each mirror server response being created at one of the corresponding mirror servers responsive to the receipt of one of the mirror server requests,
  h) sending the mirror server responses over the network from the corresponding mirror server to the client computer,
  i) receiving a plurality of mirror server responses to the mirror server requests from the corresponding mirror servers, and
  j) selecting a particular mirror server at the client computer from among the mirror servers responding to the plurality of mirror server requests.

The invention further includes a computer program product comprising a computer usable medium having computer readable program code means embodied thereon for selecting a mirror server for client-host interaction over a network. The computer program product includes computer readable code means for accomplishing the method steps described above.

In addition to the system wide method described above, the present invention is directed to methods and computer program products embodying such methods for selecting a mirror server at the client computer from among a list of mirror servers supplied by a host server and to methods of providing mirror server information to a client computer by the host server.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE PREFERRED EMBODIMENTS

Figure 1:
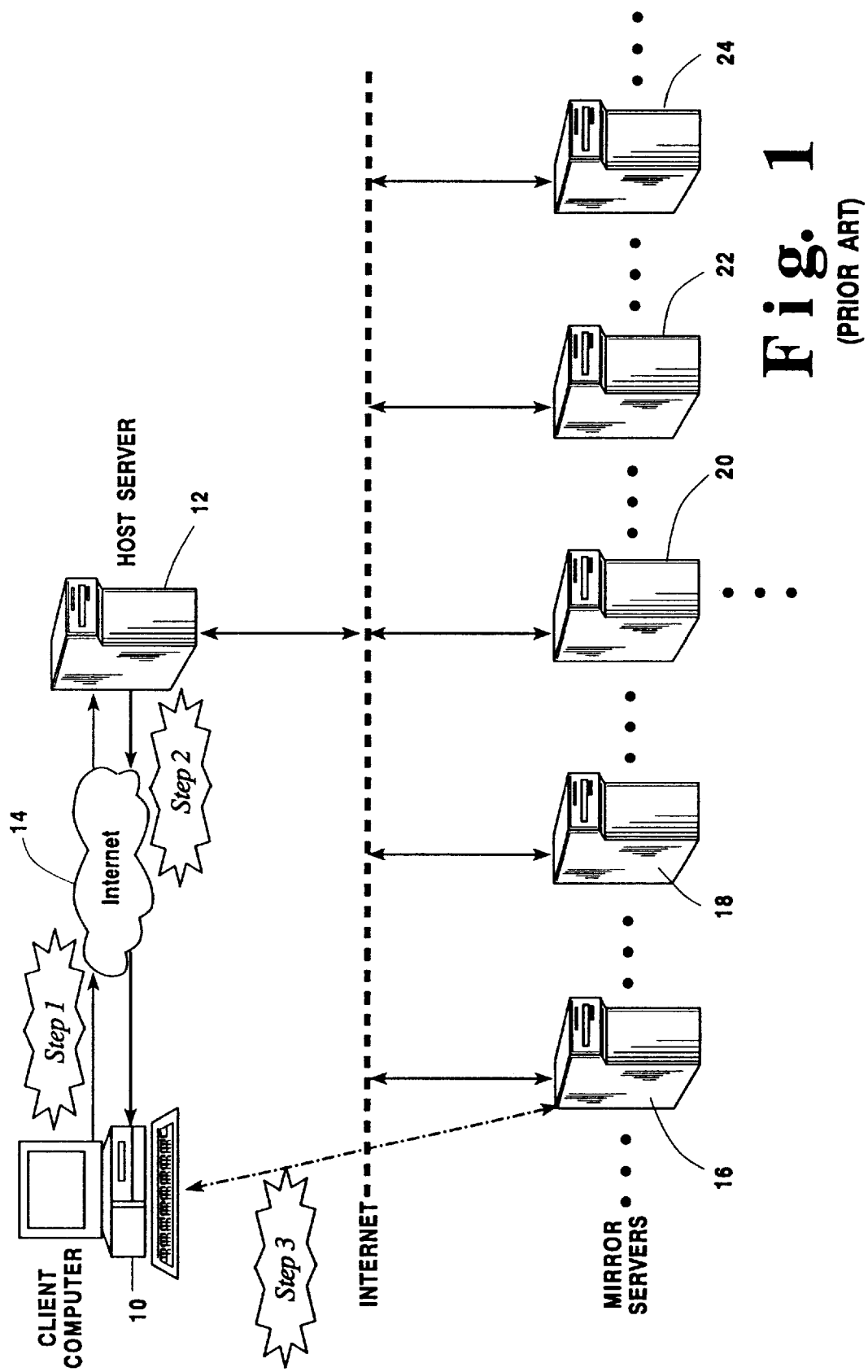
FIG. 1 is a schematic depiction with flow diagram elements showing a prior art method of selecting a particular mirror server for continued client-host interaction from among a plurality of identical mirror servers, all of which replicate a host server and all of which are connected together through the Internet.

In describing the preferred embodiment of the present invention, reference will be made herein to FIGS. 1–4 of the drawings in which like numerals refer to like features of the invention. Features of the invention are not necessarily shown to scale in the drawings.

An understanding of the method and system of this invention may best be achieved by an initial consideration of the following principal program components, classified according to whether they lie on the server side or the client side.

Client-side Program

The client computer includes a browser application interface (BAI), a distribution manager (DM), a calibration manager (CM) and multiple calibration applets that correspond to mirror servers on a list of possible mirror servers sent by the host server responsive to an initial information request from the client computer.

The browser application interface interacts directly with the external world, as well as with embedded distribution manager and calibration manager program modules, and receives the mirror server address list from the host server. The distribution manager is responsible for initiating the calibration applet programs. The calibration applets are responsible for contacting their assigned mirror server and determining round trip response time. The calibration manager is responsible for compiling the results reported by each of the applets, and determining the optimal mirror server to connect to based upon the reported response times.

Host Server-side Program

The host server program includes a query manager and a mirror server manager. The mirror server manager is responsible for maintaining the address list of available mirror servers. The query manager is responsible for handling information requests from client computers and for sending responses with the mirror server address list.

Referring now to the drawings, FIG. 1 shows a typical conventional method of selecting a mirror server for client-host interaction. In Step 1 of FIG. 1 the client computer 10 tries to contact host server 12 through the Internet 14 by sending an initial information request to the URL (e.g., www.hostserver.com) of the host server 12. Note that to reduce drawing clutter, the Internet (marked with reference number 14) is generally depicted at several separated points in the drawings, but that all such points are actually interconnected.

In Step 2 of FIG. 1 the host server 12, to which the URL (www.hostserver.com) resolves, responds in a prior art method to redirect the client computer to a mirror server. The response is either to return an HTTP redirect code, automatically redirecting the client to one of the mirror servers 16, 18, 20, 22 and 24, or, more commonly, the host server sends a response asking the human user at the client computer to manually select one of the mirror servers.

In Step 3 of FIG. 1 the client browser connects to the mirror server chosen by the human user or to the mirror server to which it has been redirected. All future client-host interactions proceed with the selected mirror server.

Figure 2:
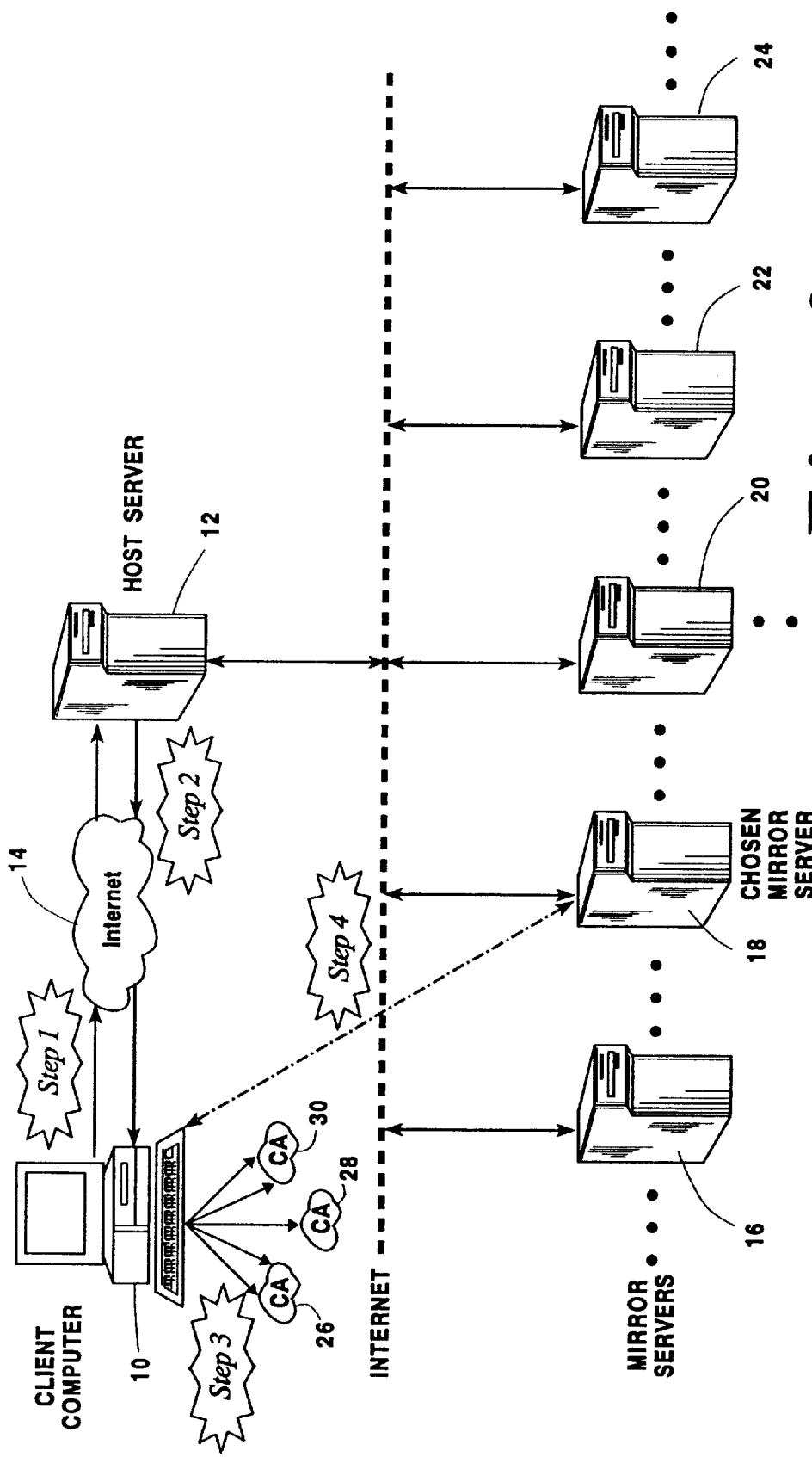
FIG. 2 is a schematic depiction corresponding to the Internet connection structure of FIG. 1 with new flow diagram elements showing the method of the present invention for automatically selecting a mirror server from among the plurality of identical mirror servers.

FIG. 2 provides an overview of the present invention. Step 1 of FIG. 2 proceeds as described above for Step 1 of FIG. 1, with the client computer 10 sending an initial information request to the URL of the host server 12. In Step 2 of FIG. 2 the host server 12 returns the requested web content, but also returns a list of mirror server addresses with the web content.

In Step 3 of FIG. 2 the web browser program in the client computer receives the list of mirror servers and spawns multiple calibration applet (CA) programs 26, 28 and 30 corresponding to the mirror server addresses received. There may be a calibration applet spawned for every mirror server address in the list, or a subset of the addresses may be used to limit the resources needed for calibration applet processing. Each applet makes an identical HTTP mirror server request to its corresponding mirror server. No two applets attempt to contact the same server. Each applet measures the round trip latency averaged across a number of such requests. Preferably, abnormal results are identified and discarded. The number of averaged requests may be user specified. The round trip times are compared between applets and a "winner applet" having the lowest time is identified.

In Step 4 of FIG. 2 the client computer browser program connects to the mirror server corresponding to the IP address associated with the "winner applet" of Step 3 (e.g. mirror server 18). All future client-host interactions are conducted with the winning mirror server during this session.

Figure 3:
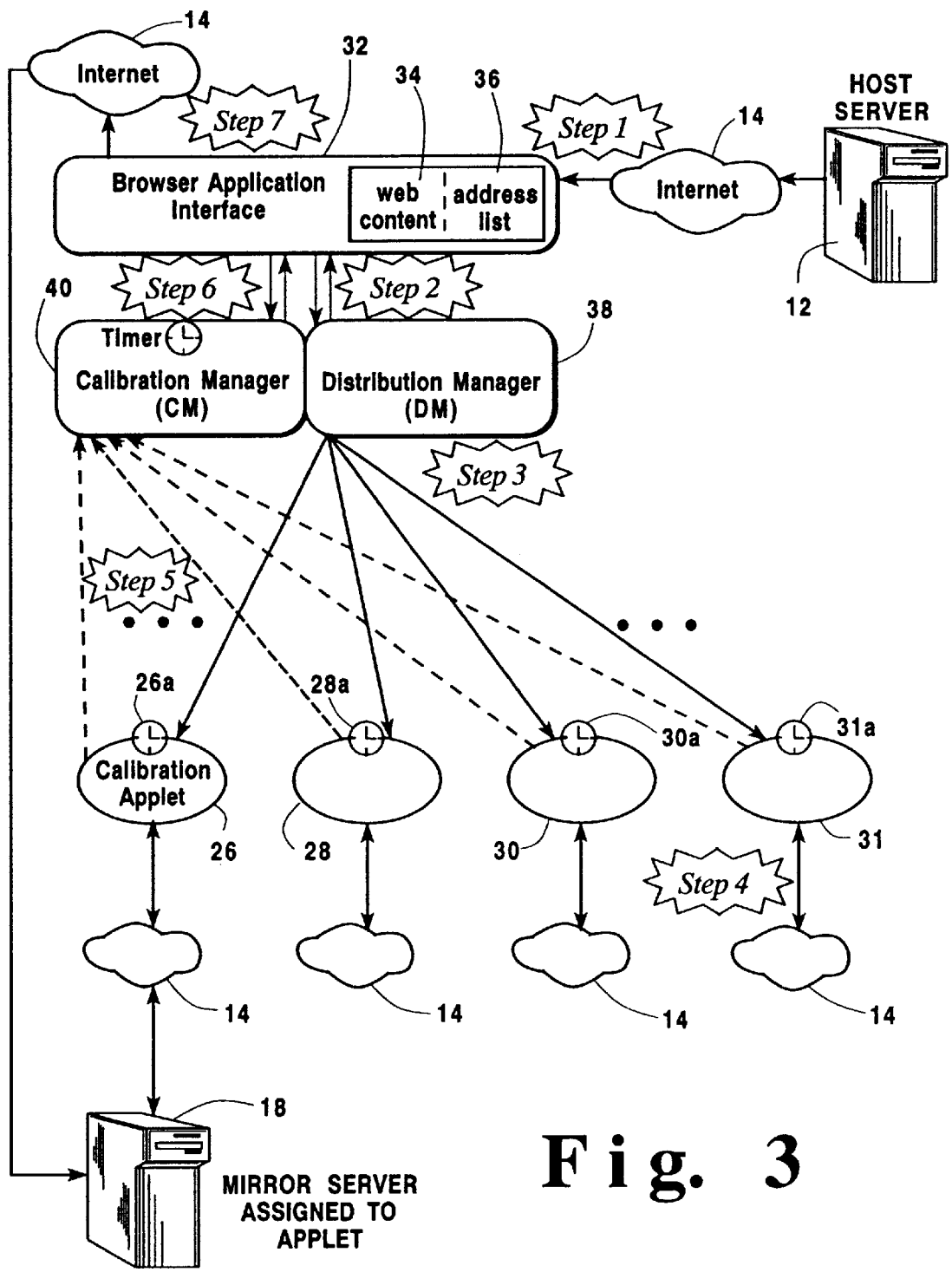
FIG. 3 is modular program structure diagram showing the program modules and interaction thereof in the web browser program of the client computer which implements the method of this invention for automatically selecting a mirror server from among the plurality of identical mirror servers.

FIG. 3 provides a more detailed diagram of the client computer program and the interaction between the web browser and the calibration applets. In FIG. 3 Step 1, the host server 12 responds to the initial information request from the browser application interface program module 32 and returns the requested web content 34. In addition to the requested web content 34, a mirror server address list 36 is attached, comprising a set of IP addresses corresponding to the set of available mirror servers.

In Step 2 of FIG. 3 the browser application interface transfers the set of IP addresses received to its distribution manager 38. In Step 3, the distribution manager (DM) 38 spawns multiple calibration applets 26, 28, 30 and 31. Each applet uniquely corresponds to one and only one of the IP addresses in the address list 36. Simultaneously, the distribution manager notifies the calibration manager (CM) 40 that calibration applets have been initiated.

In the preferred design, the distribution manager 38 includes in the notification to the calibration manager 40, the number of applets that have been initiated, the number of trials that each applet is expected to conduct, and the timeout period that has been specified for each trial.

The distribution manager exercises considerable discretion. The distribution manager can choose to limit itself to a subset of the set of IP addresses received from the browser application interface. Such a choice, for instance, may be based upon known client computer characteristics, such as processing speed, current CPU usage, other background processes etc. If the distribution manager chooses to limit itself to 'x' IP addresses, it selects the first 'x' addresses as they appear in the mirror server address IP list returned from the host server. The reason for choosing the first 'x' addresses, rather than any random combination, is that the IP addresses returned by the central server host are preferably pre-ranked from first to last in order of increasing server load. This allows the distribution manager to easily select a subset of addresses that correspond to mirror servers having a low load.

The distribution manager 38 also specifies how many trials each applet should conduct. This number may be specified by the human user, but the distribution manager can be configured to pick from a range of (user specified) possibilities, based upon current client computer characteristics. Finally, when initiating threads, the distribution manager specifies a timeout period, which indicates that an applet should abort a request if a response is not received within a certain amount of time.

In Step 4 of FIG. 3 each applet makes an (identical) HTTP mirror server request over the Internet 14 to its assigned unique IP address for its assigned mirror server. Each applet measures the round trip latency averaged across a distribution manager specified number of requests using internal timers 26a, 28a, 30a and 31a.

In Step 5 of FIG. 3 each applet reports to the calibration manager with its average round trip latency statistics and the IP address of the mirror server it was assigned to. The calibration manager maintains a timer, started from the moment that it receives notification from the distribution manager that the applets were initiated. Any applets which fail to report to the calibration manager within the time-out period, are ignored. The calibration manager's time-out period is computed dynamically by the calibration manager, and is equal to the product of the number of trials being conducted by each applet multiplied by the time-out period for each trial. This information is reported to the calibration manager by the distribution manager.

In Step 6 of FIG. 3 the "winner applet" is identified by the calibration manager, based upon the reported average round trip latency times. The latency time may be calculated as a simple average or as an average based on a subset of results with unusually long or short spurious results discarded. Alternatively, a more sophisticated statistical measure may be calculated for expected latency based on the result set. The calibration manager then determines the "winner applet" by comparing the latencies calculated and selecting the mirror server with the fastest response time. The calibration manager then reports the IP address/mirror server corresponding to the "winner applet" to the browser application interface 32.

In Step 7 of FIG. 3 the client browser connects to the selected mirror server 18 having the IP address associated with the "winner applet" 26 of Step 6. All future interactions during this session with the desired Internet host, in fact, occur with this selected mirror server 18 which replicates the original host server 12. As a result of the described selection process, mirror server 18 will be relatively more responsive to the client computer either because it is lightly loaded as compared to the other mirror servers, or because it is accessible through a relatively speedy and uncongested pathway through the Internet.

Figure 4:
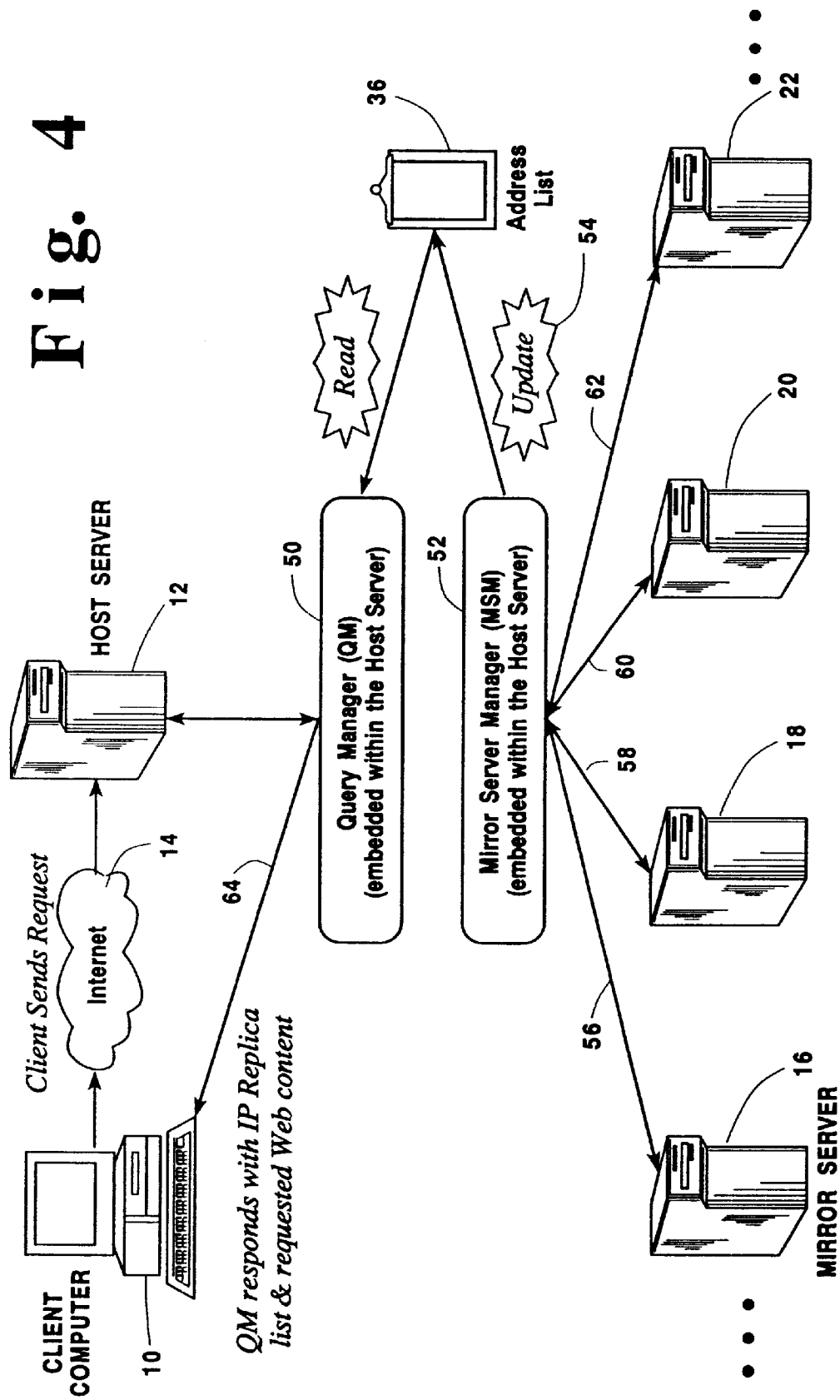
FIG. 4 is modular program structure diagram showing the program modules and interaction thereof in the host server program of the host server which supplies the client computer's web browser program in FIG. 3 with a list of mirror servers as needed to implement the method of this invention for automatically selecting a mirror server from among the plurality of identical mirror servers.

FIG. 4 provides a diagram of the host server program and the interaction between the query manager 50 and the mirror server manager 52 program modules.

The mirror server manager 52 is responsible for maintaining a suitably updated, and well-ordered listing of the IP addresses of the available mirror servers forming the mirror server address list 36. The mirror server address list 36 is initially specified by the host server system administrator, and is updated whenever a new mirror server is added or an old one removed.

In the preferred design, the mirror server manager 52 periodically queries each mirror server 16, 18, 20 and 22 on the address list 36 to ensure that the mirror servers are actually "alive" and able to respond. These queries 56, 58, 60 and 62 and the corresponding responses are sent over the Internet and occur at a frequency specified by the host server system administrator. A server that does not respond to the mirror server manager's queries is presumed to be down. A mirror server that is down is temporarily removed from the mirror server address list 36 by the mirror server manager 52 in update process 54 . Preferably, the mirror server manager also sends the host server system administrator an e-mail notifying him or her that the designated mirror server was found to be unresponsive.

When querying each mirror server, the mirror server manager also will preferably ask for the mirror server's current load. Any desired type of conventional heuristic for server load, such as percentage CPU utilization, etc. may be used as a measure of load. Upon receiving information specifying each server's load, the mirror server manager preferably prioritizes the mirror servers on the address list 36 with the lowest loaded servers listed at the top. By ranking the mirror servers in this way, the distribution manager on the client-side can easily select an optimum subset of the mirror server addresses to query. By choosing to query only the first 'x' addresses that appear in the address list, the client computer conserves resources, reduces traffic on the network, and is assured of querying only those servers that have the lowest load.

The query manager program module is responsible for handling information requests from the client computer 10. Whenever the host server 12 receives a query from a client computer, the query is propagated to the query manager 50. The query manager determines the IP address of the client making the query, and simply sends the most recently available version of the mirror server address list 36 back to the client (as indicated at 64), along with the requested web content.

After the mirror server is selected, until the browser application is restarted, the client computer only caches the IP address of the host server, and does not cache the IP address of the particular mirror server chosen. This prevents the load on web servers from being dependent upon variations in client access patterns. Further, because client requests are often bursty, if caching of the selected mirror server were allowed, all requests would be directed to the cached server alone, thus disproportionately increasing its load and mitigating the effects of the described optimization.

It should also be noted that the client-side human user is preferably given the freedom of being able to specify how many trials the "calibration applets" should conduct before comparing measured round-trip latency averages to determine a "winner applet." Identifying the "optimal" mirror site replica is essentially a probabilistic problem, since the World Wide Web is an asynchronous, variable-delay communication medium. As such, no solution can ever guarantee that the client will connect to the "optimal" replica in an absolute sense. However, in this invention, as the number of trials increases, it becomes more and more likely, in a probabilistic sense, that the "optimal" mirror server has been correctly identified.

With the invention design described above, the actual interactions among the nodes of the host-side network tree involve very small amounts of data transfer and computation. There is only minimal extra data transfer during the return of the mirror server address list 36 to the client and in the course of processing applet queries from the client, when the client is attempting to identify the "best" web server. As such, these interactions do not impose any significant overhead upon the system.

It will also be seen by those with skill in this art that there is no need to engage in network or packet level communication. Once a close proximity mirror server 18 has been located, a direct connection is established between the client and the server. There is no intermediate agent which needs to be aware of every packet passed between client and the server. This eliminates a potential central point bottleneck, which is required in other designs.

Adding a new mirror server in compliance with this invention is extremely convenient and cost effective for the host enterprise. A mirror server may be added to the existing mirror server network without having to modify the existing infrastructure in any significant way. It is only necessary to add the address of the new mirror server to the address list 36 supplied by the host server in the first response.

The invention provides a sophisticated level of load balancing, and ensures that no problems arise from client or name-server caching. The client and name-servers are only able to cache the IP address of the root node of the host network, which only performs the function of returning the set of mirror server IP addresses (corresponding to the replica mirror servers) to the client.

The design of this invention also ensures that the entire mirror server selection process is completely transparent to the human-user who is attempting to access the web site through the host server. Once the appropriate mirror server has been selected, the interaction between that server and the client can proceed without any other component of the system being aware of the interaction.

The method described exhibits several desirable and advantageous characteristics:

1. Transparent name resolving: a human user making a request for the host need not be aware that the system is fetching the web page from a replicated server.
2. Flexibility: The system employs a dynamic policy for picking a replica to deal with any particular request, and is capable of catering to different users with diverse objectives.
3. Scalability: Server allocation will gracefully scale as the number of clients increases.
4. Extensibility: The host will be able to add new replicas to its system easily.
5. Ease of Deployment: The system conforms to existing protocols and standards and does not involve extensive changes to the existing web infrastructure.
6. Fault Transparency: The allocation method is able to detect unresponsive sever machines, and is capable of transparently redirecting requests to functional replicas. It is also able to dynamically monitor and reincorporate unresponsive machines, should they become available again.
7. Accuracy: the server allocation method takes advantage of topological proximity, while still accommodating dynamic changes in network performance and server load.

The present invention includes software incorporating the process steps and instructions described above which are executed in different computers connected to the Internet. One portion of the software of this invention is executed in the host server. Another portion is executed in the client computer, and yet another portion of the software is executed in the mirror servers.

Each of these software portions comprises a computer program that may be stored on an otherwise conventional program storage device, such as a semiconductor chip, a read-only memory, magnetic media such as a diskette or computer hard drive, optically based storage devices, such as CD-ROMs, or on any other type of computer program storage media which is readable and executable by a computer. It is expected that the client computer based computer programs described here may be included as program modules and incorporated into a web browser program.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of selecting a mirror server for client-host interaction over a network comprising the steps of:

creating an information request at a client computer;

sending the information request over the network from the client computer to a host server;

creating a list of mirror servers at the host server;

sending a response to the information request, said response being sent from the host server to the client computer over the network and said response including the list of mirror servers;

creating a plurality of mirror server requests at the client computer, each mirror server request corresponding to a mirror server on the list of mirror servers;

sending the plurality of mirror server requests over the network from the client computer to the corresponding mirror servers;

creating a plurality of mirror server responses to the mirror server requests, each mirror server response being created at one of the corresponding mirror servers responsive to the receipt of one of the mirror server requests;

sending the mirror server responses over the network from the corresponding mirror server to the client computer;

receiving a plurality of mirror server responses to the mirror server requests from the corresponding mirror servers; and selecting a particular mirror server at the client computer from among the mirror servers responding to the plurality of mirror server requests.

2. The method of selecting a mirror server for client-host interaction over a network according to claim 1 wherein the step of selecting a particular mirror server at the client computer comprises:

determining the response time of the mirror servers to the plurality of mirror server requests;

ranking the mirror servers according to the response times of the mirror servers; and selecting the particular mirror server at the client computer having the fastest response time.

3. The method of selecting a mirror server for client-host interaction over a network according to claim 1 wherein the step, of creating a list of mirror servers at the host server includes the steps of:

creating load status messages at the mirror servers, each load status message containing load information corresponding to the load on the mirror server;

sending the load status messages over the network from the mirror servers to the host server; and creating the list of mirror servers at the host server by ranking the mirror servers according to the load information.

4. The method of selecting a mirror server for client-host interaction over a network according to claim 3 wherein the step of creating a list of mirror servers at the host server further includes the step of sending load inquiry requests over the network from the host server to the mirror servers; and the step of creating load status messages at the mirror servers comprises creating the load status messages at the mirror servers responsive to the load inquiry requests.

5. The method of selecting a mirror server for client-host interaction over a network according to claim 3 wherein the step of creating a list of mirror servers at the host server comprises continuously maintaining an updated list of load-ranked mirror servers by periodically sending the load status messages from the mirror servers to the host server.

6. The method of selecting a mirror server for client-host interaction over a network according to claim 5 wherein the load status messages from the mirror servers to the host server are sent responsive to periodic load inquiry requests from the host server.

7. The method of selecting a mirror server for client-host interaction over a network according to claim 1 wherein:

the step of creating a plurality- of mirror server requests at the client computer includes the steps of:

initiating a plurality of calibration applets, each calibration applet corresponding to a mirror server on the list of mirror servers; and creating the mirror server request for each mirror server in the calibration applet corresponding to said mirror server; and the step of sending the plurality of mirror server requests over the network comprises sending the mirror server request for each mirror server from the calibration applet corresponding to said mirror server to said mirror server.

8. The method of selecting a mirror server for client-host interaction over a network according to claim 7 wherein the step of sending the plurality of mirror server requests over the network from each calibration applet further includes the step of starting a timer in each applet when the corresponding mirror server request is sent.

9. The method of selecting a mirror server for client-host interaction over a network according to claim 8 wherein the step of receiving a plurality of mirror server responses to the mirror server requests includes stopping the timer in each calibration applet corresponding to each responding mirror server.

10. The method of selecting a mirror server for client-host interaction over a network according to claim 9 wherein the step of selecting a particular mirror server at the client computer includes the steps of:

reporting the elapsed round trip time from the timers in each calibration applet;

ranking the mirror servers corresponding to the calibration applets reporting a round trip time; and selecting the particular mirror server having the lowest reported round trip elapsed time.

11. The method of selecting a mirror server for client-host interaction over a network according to claim 10 wherein the step of selecting a particular mirror server at the client computer includes the steps of:

creating additional mirror server requests in each calibration applet;

sending the additional mirror server requests to the mirror server corresponding to the calibration applet creating the additional mirror server requests;

timing the round trip time with the timer in each calibration applet for the corresponding mirror server from the sending of each mirror server request to the receipt of each mirror server response;

averaging the round trip times in each calibration applet;

reporting averaged round trip times from each calibration applet; and ranking the mirror servers corresponding to the calibration applets reporting the averaged round trip times.

12. A program storage device readable by a machine, tangibly embodying a program of instructions executable by the machine to perform method steps for selecting a mirror server for client-host interaction over a network, said method steps comprising:

creating an information request at a client computer;

sending the information request over the network from the client computer to a host server;

creating a list of mirror servers at the host server;

sending a response to the information request, said response being sent from the host server to the client computer over the network and said response including the list of mirror servers;

creating a plurality of mirror server requests at the client computer, each mirror server request corresponding to a mirror server on the list of mirror servers;

sending the plurality of mirror server requests over the network from the client computer to the corresponding mirror servers;

creating a plurality of mirror server responses to the mirror server requests, each mirror server response being created at one of the corresponding mirror servers responsive to the receipt of one of the mirror server requests;

sending the mirror server responses over the network from the corresponding mirror server to the client computer;

receiving a plurality of mirror server responses to the mirror server requests from the corresponding mirror servers; and selecting a particular mirror server at the client computer from among the mirror servers responding to the plurality of mirror server requests.

13. A computer program product comprising a computer usable medium having computer readable program code means embodied thereon for selecting a mirror server for client-host interaction over a network, said computer program product having:

computer readable code means for creating an information request at a client computer;

computer readable code means for sending the information request over the network from the client computer to a host server;

computer readable code means for creating a list of mirror servers at the host server;

computer readable code means for sending a response to the information request, said response being sent from the host server to the client computer over the network and said response including the list of mirror servers;

computer readable code means for creating a plurality of mirror server requests at the client computer, each mirror server request corresponding to a mirror server on the-list of mirror servers;

computer readable code means for sending the plurality of mirror server requests over the network from the client computer to the corresponding mirror servers;

computer readable code means for creating a plurality of mirror server responses to the mirror server requests, each mirror server response being created at one of the corresponding mirror servers responsive to the receipt of one of the mirror server requests;

computer readable code means for sending the mirror server responses over the network from the corresponding mirror server to the client computer;

computer readable code means for receiving a plurality of mirror server responses to the mirror server requests from the corresponding mirror servers; and computer readable code means for selecting a particular mirror server at the client computer from among the mirror servers responding to the plurality of mirror server requests.

14. A method of selecting a mirror server at a client computer from among a list of mirror servers for client-host interaction over a network comprising the steps of:

creating an information request at the client computer;

sending the information request over the network from the client computer to a host server;

receiving a response to the information request from the host server, said response including a list of mirror servers;

creating a plurality of mirror server requests at the client computer, each mirror server request corresponding to a mirror server on the list of mirror servers;

sending the plurality of mirror server requests over the network from the client computer to the corresponding mirror servers;

receiving a plurality of mirror server responses to the mirror server requests from the corresponding mirror servers; and selecting a particular mirror server at the client computer from among the mirror servers responding to the plurality of mirror server requests.

15. A program storage device readable by a machine, tangibly embodying a program of instructions executable by the machine to perform method steps for selecting a mirror server at a client computer from among a list of mirror servers for client-host interaction over a network, said method steps comprising:

creating an information request at the client computer;

sending the information request over the network from the client computer to a host server;

receiving a response to the information request from the host server, said response including a list of mirror servers;

creating a plurality of mirror server requests at the client computer, each mirror server request corresponding to a mirror-server on the list of mirror servers;

sending the plurality of mirror server requests over the network from the client computer to the corresponding mirror servers;

receiving a plurality of mirror server responses to the mirror server requests from the corresponding mirror servers; and selecting a particular mirror server at the client computer from among the mirror servers responding to the plurality of mirror server requests.

16. A computer program product comprising a computer usable medium having computer readable program code means embodied thereon for selecting a mirror server at a client computer from among a, list of mirror servers for client-host interaction over a network, said computer program product having:

computer readable code means for creating an information request at the client computer;

computer readable code means for sending the information request over the network from the client computer to a host server;

computer readable code means for receiving a response to the information request from the host server, said response including a list of mirror servers;

computer readable code means for creating a plurality of mirror server requests at the client computer, each mirror server request corresponding to a mirror server on the list of mirror servers;

computer readable code means for sending the plurality of mirror server requests over the network from the client computer to the corresponding mirror servers;

computer readable code means for receiving a plurality of mirror server responses to the mirror server requests from the corresponding mirror servers; and computer readable code means for selecting a particular mirror server at the client computer from among the mirror servers responding to the plurality of mirror server requests.

17. A method of providing mirror server information to a client computer from a host server for client-host interaction over a network comprising the steps of:

receiving an information request at the host server from the client computer;

receiving load information from a plurality of mirror servers;

creating a list of mirror servers at the host server by ranking said mirror servers according to the load information from the plurality of mirror servers;

continuously updating the list of load-ranked mirror servers at the host server by periodically sending load status messages from the mirror servers to the host server, each load status message containing load information corresponding to the load on the mirror server; and sending a response to the information request, said response being sent from the host server to the client computer over the network and said response including the list of load-ranked mirror servers.

18. A program storage device readable by a machine, tangibly embodying a program of instructions executable by the machine to perform method steps for providing mirror server information to a client computer from a host server for client-host interaction over a network, said method steps comprising:

receiving an information request at the host server from the client computer;

receiving load information from a plurality of mirror servers;

creating a list of mirror servers at the host server by ranking said mirror servers according to the load information from the plurality of mirror servers;

continuously updating the list of load-ranked mirror servers at the host server by periodically sending load status messages from the mirror servers to the host server, each load status message containing load information corresponding to the load on the mirror server; and sending a response to the information request, said response being sent from the host server to the client computer over the network and said response including the list of load-ranked mirror servers.

19. A computer program product comprising a computer usable medium having computer readable program code means embodied thereon for providing mirror server information to a client computer from a host server for client-host interaction over a network, said computer program product having:

computer readable code means for receiving an information request at the host server from the client computer;

computer readable code means for receiving load information from a plurality of mirror servers;

computer readable code means for creating a list of mirror servers at the host server by ranking said mirror servers according to the load information from the plurality of mirror servers;

continuously updating the list of load-ranked mirror servers at the host server by periodically sending load status messages from the mirror servers to the host server, each load status message containing load information corresponding to the load on the mirror server; and computer readable code means for sending a response to the information request, said response being sent from the host server to the client computer over the network and said response including the list of load-ranked mirror servers.

20. A system for selecting a mirror server for client-host interaction over a network comprising:

a host server;

a client computer;

a plurality of mirror servers replicating the host server;

a client computer program stored in program storage accessible by the client computer, the client computer program including computer readable code for:

creating an information request;

sending the information request over the network to the host server;

receiving a response to the information request from the host server, said response including a list of the mirror servers;

creating a plurality of mirror server requests, each mirror server request corresponding to one of the mirror servers on the list of mirror servers;

sending the plurality of mirror server requests over the network to the corresponding mirror servers;

receiving a plurality of mirror server responses to the mirror server requests from the corresponding mirror servers; and selecting a particular mirror server at the client computer from among the mirror servers responding to the plurality of mirror server requests to continue client server interaction;

a host server computer program stored in program storage accessible by the host server, the host server computer program including computer readable code for:

receiving the information request from the client computer;

receiving load information from the plurality of mirror servers;

creating the list of mirror servers at the host server, said list of mirror servers being created responsive to the receipt of the load information from the plurality of mirror servers; and sending the response to the information request from the client computer including the list of mirror servers; and a plurality of mirror server computer programs stored in program storage accessible by the mirror servers, each mirror server computer program including computer readable code for:

sending load information-to the host server; and responding to the mirror server request from the client computer.

* * * * *